United States Patent [19]

Greer et al.

[11] 4,092,031

[45] May 30, 1978

[54] TRACKED SUPPORT FOR A CABINET

[75] Inventors: Carl R. Greer; Clarence W. Denham, Jr., both of Louisville, Ky.

[73] Assignee: General Electric Company, Louisville, Ky.

[21] Appl. No.: 756,231

[22] Filed: Jan. 3, 1977

[51] Int. Cl.² .............................................. A47B 91/00
[52] U.S. Cl. ...................................... 280/28.5; 16/39; 280/79.2; 312/250
[58] Field of Search ......................... 280/13, 11.1, 28.5, 280/16, 18, 79.2; 16/38, 39, 427, 45; 312/250; 248/188.04

[56] References Cited

U.S. PATENT DOCUMENTS

| 3,107,924 | 10/1963 | Cushman | 280/28.5 |
| 3,191,212 | 6/1965 | Reiss, Sr. et al. | 16/42 R |
| 3,868,123 | 2/1975 | Berg et al. | 312/250 |
| 3,899,801 | 8/1975 | Carrier | 16/45 |

Primary Examiner—Casmir A. Nunberg
Attorney, Agent, or Firm—Steven C. Schnedler; Francis H. Boos

[57] ABSTRACT

A tracked support having a large load-bearing area is provided for movably supporting a cabinet. The support comprises an elongated horizontal carrier mounted to the cabinet and a continuous flexible track is formed into an encircling band and rotatably mounted around the carrier. The cabinet may be supported by a plurality of such supports.

9 Claims, 5 Drawing Figures

TRACKED SUPPORT FOR A CABINET

BACKGROUND OF THE INVENTION

1. Field of the Invention

This invention relates to supports for cabinets and more particularly to movable supports for relatively heavy cabinets.

2. Description of the Prior Art

It is frequently necessary to move appliances such as refrigerators for cleaning and other purposes. Early appliance models used glide bolts at each corner to support the cabinet, each bolt having a large flat head for engaging the floor. The floor materials were typically of a hardwood or hard linoleum surface and the glide bolts could slide over the floor surface relatively easily for movement of the cabinets. Appliances have developed to include larger and heavier cabinets which cannot be slidably moved without great effort and probable damage to the flooring surfaces. Presently, many large appliance cabinets have a mobility feature which includes cylindrical rollers to support the cabinets and to allow the cabinets to roll over the supporting floor surface. The rollers provide rolling friction rather than sliding friction and facilitate movement of the heavy cabinets. However, the contact area of the rollers is limited to the tangential line contact of each roller with the floor, thereby transmitting the entire weight of the cabinet to a few small areas. The resulting high unit forces exerted over an extended period of time can cause the rollers to penetrate into the floor covering surface. This greatly impairs the mobility of the cabinet and more importantly causes permanent damage to the floor covering of the supporting surface. This problem has been aggravated by the increased use of decorative carpeting and soft textured tile in locations where heavy appliances are required to be movably located. The carpeted and soft textured tile surfaces are easily deformed by heavy loads supported on relatively small bearing areas.

The prior art has recognized the problem and various approaches have been directed toward a solution. One such approach was directed to a yieldable caster which could resiliently deform under a heavy load to provide a flattened bottom surface to somewhat increase the bearing area of the caster. The increased bearing area is limited to the area projected by the caster's width and its diameter and requires a continuous reshaping of the caster during movement. The application of a heavy load over an extended period of time may cause a permanent set on the bottom surface of such a caster, thereby preventing the desired deformation and rotation of the caster during subsequent attempted movement of the appliance.

Another approach to the problem is shown in U.S. Pat. No. 2,644,691 — Pohle and is directed to a roller device for moving heavy loads. The roller device comprises an endless roller track self-contained within a housing. The track is comprised of a multiplicity of hollow cylindrical rollers, each having a central shaft. The ends of adjacent shafts are linked to form an endless track. The roller device is adapted to be temporarily positioned beneath a load to facilitate movement of the load and is removed after the load is in the desired location. The objects of the Pohle patent are concerned only with the problem of moving a load and do not consider the floor covering surface over which the load is moved. The roller track distributes the weight of the load through the multiplicity of rollers, each in tangential line contact with the surface of the floor, and not over a continuous load-bearing area. Moreover, the sharp metallic edges of the individual cylindrical rollers may cut into any sloping or irregular floor surfaces. The roller device is too large and expensive to be considered as a permanent part of or attachment to the object being moved.

By this invention, the disadvantages and limitations of the prior art are overcome and a movable tracked support having a large bearing area is provided for a cabinet to minimize depressions in soft floor coverings and to facilitate movement of the cabinet.

Accordingly, it is an object of this invention to provide a tracked support having a large load-bearing area for movably supporting a cabinet to distribute the load and thereby minimize depressions in a floor covering surface.

It is another object of this invention to provide a tracked support having a large load-bearing area to distribute the load and thereby facilitate movement of a cabinet with relative ease over a supporting surface.

It is another object of the invention to provide a tracked support which can support a heavy cabinet for extended periods of time without adversely affecting subsequent movement of the cabinet thereby retaining its function and usefulness over a long period of time.

It is still a further object of this invention to provide a tracked support which combines a large load-bearing area with an ease of vertical adjustment of the cabinet to compensate for sloping surfaces.

SUMMARY OF THE INVENTION

The invention is directed to a tracked support for movably supporting a cabinet on a floor surface. The support comprises a carrier having a flat horizontal load-bearing portion of substantial area and a continuous flexible track mounted on the carrier and adapted to engage the floor surface. A portion of the track engaging the floor surface extends across the load-bearing portion of the carrier whereby the weight of the cabinet is distributed on the supporting surface over an area corresponding to the area of the load-bearing portion of the carrier. The track is mounted for movement relative to the carrier to facilitate occasional movement and repositioning of the cabinet. A backward or forward force on the cabinet results in the carrier moving along the inner surface of the track while the floor engaging outer surface of the track is forced to crawl in the direction of the force on the cabinet. The tracked support includes means for adjustably engaging the cabinet so as to support the cabinet in a desired level position on a sloping surface.

BRIEF DESCRIPTION OF THE DRAWINGS

While the novel features of the invention are set forth with particularity in the appended claims, the invention will be better understood along with other objects and features thereof from the following detailed description taken in conjunction with the drawings, in which:

DESCRIPTION OF THE PREFERRED EMBODIMENT

Figure 1:
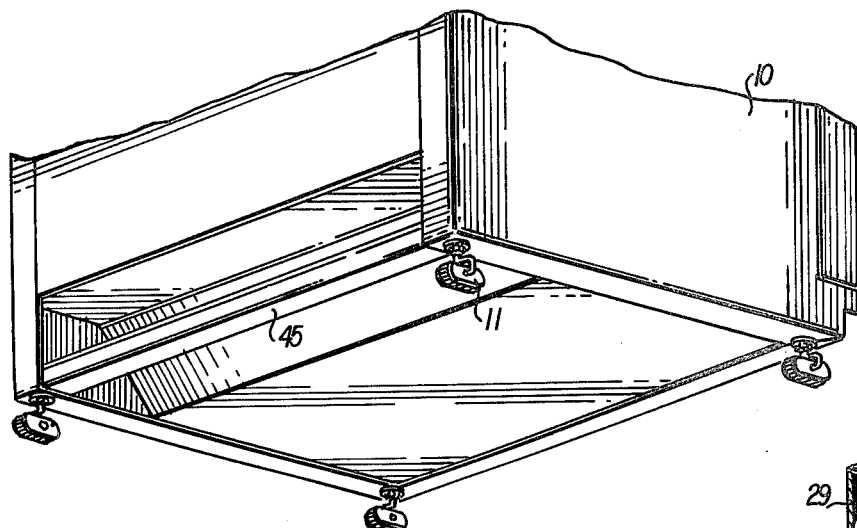
FIG. 1 is a perspective view of the underside of a refrigerator cabinet showing a plurality of tracked supports incorporating this invention.
Figure 2:
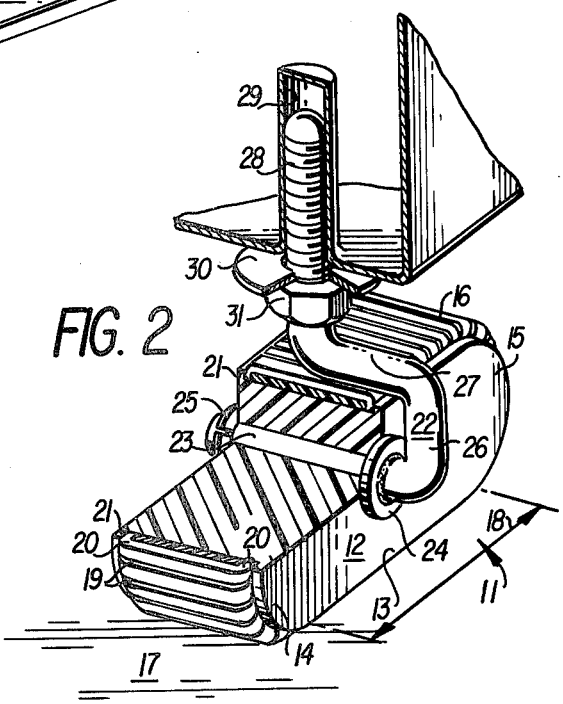
FIG. 2 is an enlarged cut-away perspective view of one of the tracked supports shown in FIG. 1.

Referring first to FIGS. 1 and 2, there is shown a portion of a refrigerator cabinet 10 having a tracked support 11 mounted at each of the corners.

In order to distribute the weight of the cabinet over a large area, the tracked support 11 includes a carrier 12 having a load-bearing portion 13 of substantial area. The load-bearing portion 13 is essentially a flat, elongated, rectangular, horizontal surface. The carrier 12 includes arcuate ends 14 and 15 which generally extend from and are in line with the width of the load-bearing portion 13. The load-bearing portion 13 and arcuate ends 14 and 15 form a portion of a path extending generally around the perimeter of the carrier 12. The carrier 12 is formed from a material such as nylon and has a smooth outer surface.

It is readily apparent that the tracked support will distribute the cabinet weight over a substantially larger area than a cylindrical roller having only tangential line contact on a supporting surface. If the cabinet design weight is known and the desired maximum force per unit of area of the supporting surface is known, the "substantial area" of each of the tracked supports can be precisely determined. For example, a cabinet having a weight of 400 pounds and a desired maximum load of 40 pounds per square inch on the supporting surface would require a total support area of 10 square inches. If four tracked supports are employed, as shown in FIG. 1, each support should have a load-bearing portion of 2.5 square inches. By comparison 40 cylindrical rollers, one inch wide, even assuming a 0.25 inch tangential engagement, would be required for equivalent contact area and unit load.

In order to facilitate movement of the cabinet, a continuous flexible track 16 is mounted on carrier 12 and adapted to engage a supporting surface 17. A particular portion 18 on continuous flexible track 16 extends across the load-bearing portion 13 of carrier 12 whereby the weight of the cabinet 10 is distributed over a substantial area of the supporting surface 17 corresponding to the area of the load-bearing portion 13 of the carrier 12. The continuous flexible track 16 is mounted to be movable relative to the carrier 12 and can slide over the path formed generally around carrier 12 to facilitate movement of the cabinet. The force required to move the cabinet is determined by the sliding resistance of the inner surface of track 16 relative to carrier 12. The continuous flexible track 16 is a material such as polypropylene extruded into the shape of the track of the desired dimensions, and having a smooth inner surface to slidably mount on the smooth surface of the nylon carrier 12. The materials and smooth surfaces of the polypropylene track 16 and the nylon carrier 12 provide the desired low sliding resistance, resulting in ease of relative movement of the flexible track and the carrier and facilitating movement of the cabinet. In addition to the low sliding friction properties, polypropylene and nylon can remain in forceable contact over extended periods of time without bonding or taking a permanent set. The polypropylene track continues to be flexible even after remaining in a given configuration for an extended period of time. The flexibility of track 16 is further assured by providing a multiplicity of lateral grooves 19 across the outer width thereof to promote bending of the track as it forms around arcuate ends 14 and 15 during movement of the cabinet. The outer edges of the track 16 are provided with radii 20 to eliminate any sharp edge which could damage the supporting surface 17. The track is retained on the carrier by providing longitudinal shoulders 21 around the perimeter of carrier 12, along which the edges of track 16 ride. The track could alternatively be aligned on the carrier by providing a crown on the upper portion of carrier 12 or by any sliding, interfitting engagement of track 16 and the perimeter of carrier 12.

Means for mounting carrier 12 on cabinet 10 is provided by mounting member 22 shown generally as a C-shaped rod having a vertical portion extending upwardly from the C-shaped rod. Mounting member 22 is normally metallic; however, any material can be used which has sufficient strength to support the weight of the cabinet and the forces involved in moving the cabinet. Mounting member 22 has a horizontal portion 23 extending through a mating aperture provided in the center of carrier 12 to pivotally attach the carrier to the mounting member. Horizontal portion 23 is provided with a shoulder 24 at one side of the carrier and an annular groove at the other side of the carrier. A retaining ring 25 is received within the groove and the carrier 12 is held on the mounting member 22 by the shoulder 24 and retaining ring 25. The carrier could be rigidly attached, but the pivotal attachment allows load-bearing portion 13 of the carrier to conform to irregularities in slope in the supporting surface for maximum surface area engagement of the tracked support. Mounting member 22 has a vertical portion 26 extending from shoulder 24 to an elevation above the upper portion of track 16. Mounting member 22 has a second horizontal portion 27 extending from vertical portion 26 to a position generally centered above the load-bearing portion 13 of the carrier. Finally, mounting member 22 has a second vertical portion 28 extending from the second horizontal portion 27 at a point centrally located relative to the carrier, and this vertical portion 28 is adapted to be received in a recess 29 formed in the cabinet. The central vertical attachment of the mounting member 22 allows each tracked support to be mounted at a single point and the movement forces will be centrally transmitted without tending to misalign the tracked support on the cabinet.

The tracked support is provided with a means for vertical adjustment to compensate for a sloping supporting surface. Threads are formed on the vertical portion 28 of the mounting member 22 and a nut 31 adjustably engages the threads. The penetration of the vertical portion 28 into the recess 29, and hence the height of that portion of the cabinet above the supporting surface, can be adjusted to compensate for a sloping supporting surface by adjusting the position of the nut 31. In order to provide a large stabilizing base, a load-bearing washer 30 is interposed between the nut 31 and the undersurface of the cabinet. Nut 31 positions load-bearing washer 30 on the vertical portion 28. Vertical adjustment is desirable for obtaining a proper door swing and for levelling cabinets such as refrigerators. If vertical adjustment is considered unnecessary in any instance the threads and nut may be omitted and the washer fixed in position on the vertical portion 28 or a shoulder of adequate size may be formed on the vertical portion 28.

Figure 3:
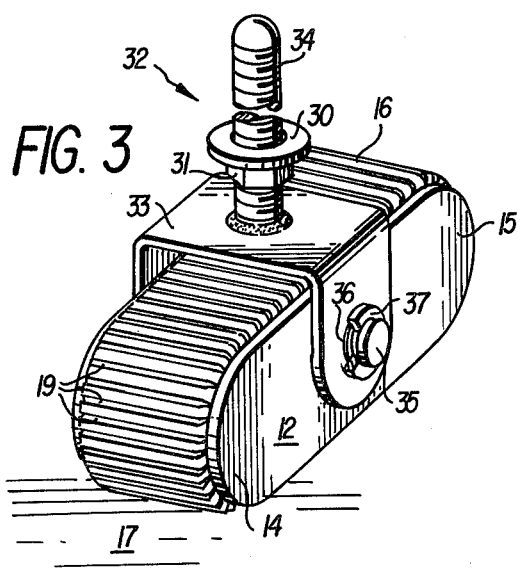
FIG. 3 is a perspective view of another embodiment of the tracked support.

An alternative embodiment of the tracked support is shown in FIG. 3. This embodiment differs from that in FIG. 2 by providing an alternative means for mounting the carrier on the cabinet. The same numerals have been employed to designate corresponding elements in FIGS. 2 and 3. The mounting means 32 comprises a yoke 33 of generally inverted U-shape and a threaded vertical portion 34 centrally mounted on the yoke 33. A transverse pin 35 is received in a mating horizontal aperture in the carrier and extends at opposite ends through aligned apertures 36 in the two side arms of the yoke 33. Retaining rings 37 are received in recesses formed in the pin 35 to retain the pin in position. Pin 35 thereby pivotally mounts the carrier to the mounting means 32. The threaded vertical portion 34 is adapted to adjustably engage the recess in the cabinet in the same manner as the vertical portion 28 in the embodiment previously described in reference to FIG. 2. Apertures 36 in the side arms of yoke 33 are positioned to generally center the tracked support with the vertical attachment to the cabinet.

Figure 4:
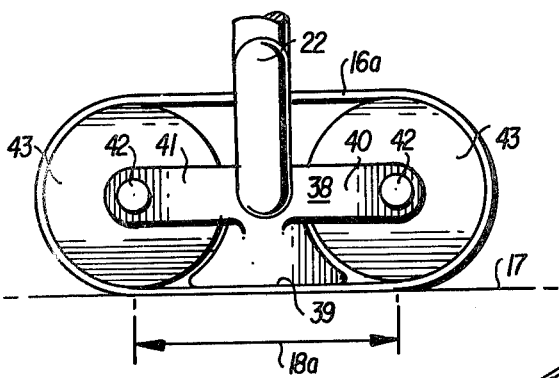
FIG. 4 is an elevational view of another embodiment of the tracked support.

Another alternative embodiment of the tracked support is shown in FIG. 4. This embodiment includes a carrier having at least one cylindrical roller in line with the flat horizontal load-bearing portion to facilitate relative movement of the track. In the specific embodiment shown in FIG. 4 the carrier includes rollers which form the ends of the carrier. The carrier comprises a frame 38 having a central flat horizontal load-bearing portion 39 of substantial area and two pairs of elongated side arms, a first pair extending in one direction from the central load-bearing portion 39 and a second pair extending in the opposite direction from the central load-bearing portion. In FIG. 4 only one side arm 40 of the first pair is shown and only one side arm 41 of the second pair is shown. The other side arm of each pair is disposed on the opposite side of the carrier. The side arms of each pair extend above and beyond the corresponding end of the load-bearing portion 39. Each pair of elongated side arms 40 and 41 is provided with spaced horizontal apertures each of which receives a pin 42. Each pin 42 extends through a mating aperture in a cylindrical roller 43. The rollers 43 are positioned in parallel and are of a diameter such that their common tangential plane is in the same plane as flat horizontal load-bearing portion 39 to thereby provide a horizontal load-bearing surface for the carrier. A continuous flexible track 16a is mounted on the carrier and is adapted to engage the supporting surface 17. A particular portion 18a on track 16a extends across the load-bearing surface of the carrier. The rollers 43 exert tangential line contact forces on the inner surface of track portion 18a. Since the track-engaging surface of each roller and the central load-bearing portion 39 are in the same plane, the tangential line contact forces of the rollers are uniformly exerted on the inner surface of track portion 18a. These separate forces are propagated through the thickness of the track in widening distribution to distribute the force over a wide area of the track instead of confining the force to the line contact normally made between a roller and a supporting surface. Carrier frame 38 includes a mounting member which may be formed in the same shape as member 22 of the embodiment shown in FIG. 2 to provide a suitable mounting means to attach the support to the cabinet. The principal advantage of this embodiment is that the carrier is in rolling contact with much of the inner surface of the track rather than pure sliding contact. Thereby, the relative movement of these elements is facilitated and the cabinet can be moved with less force. While the use of two rollers, as shown in FIG. 4 is preferred, this embodiment can be constructed, if desired, with only one pair of side arms and a single roller at one end of the carrier.

Figure 5:
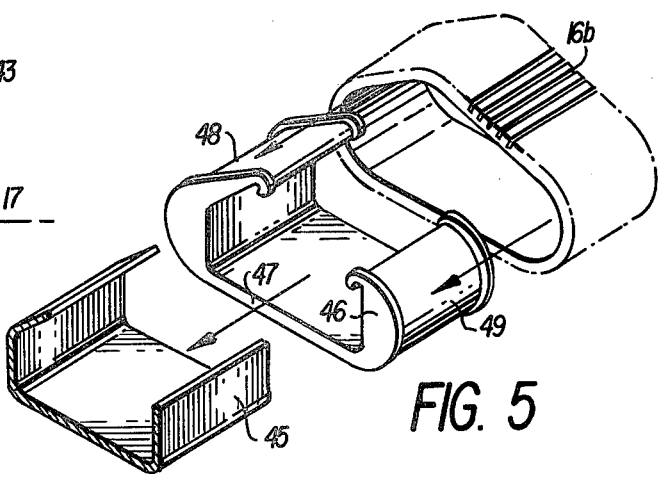
FIG. 5 is an exploded perspective view of another embodiment of a tracked support.

Referring now to FIG. 5, another alternative embodiment of the tracked support is shown. While the present invention in its broader aspects contemplates the embodiment of FIG. 5, the specific embodiment there illustrated is not part of the present invention, but rather is the invention of William M. Webb. In this embodiment the carrier and mounting means are combined to directly mount the carrier to a frame member of the cabinet. A rear cross rail frame member 45 having generally a U-shaped cross-section is shown as a part of cabinet 10 in FIG. 1. A carrier 46 includes a flat horizontal load-bearing portion 47 and arcuate ends 48 and 49 which generally extend from and correspond in width with the width of load-bearing portion 47. The interior portion of carrier 46 is adapted to engageably conform to the shape of frame member 45, thereby securely mounting carrier 46 to cabinet 10. A continuous flexible track 16b is mounted on carrier 46 and adapted to engage a supporting surface. The track 16b moves relative to the carrier in the same manner as the track 16, as previously described in reference to FIG. 2.

The invention disclosed in this application provides a tracked support which has a large load-bearing area to distribute the load of a cabinet and thereby minimizes depressions in a supporting floor covering surface. A continuous flexible track facilitates movement of the cabinet. The components of the tracked support remain functional over a long period of time and further include vertical adjustment to compensate for sloping supporting surface.

While specific embodiments of the present invention have been illustrated and described herein, it is realized that modifications and changes will occur to those skilled in the art. It is therefore to be understood that the appended claims are intended to cover all such modifications and changes as fall within the true spirit and scope of the invention.

What is claimed as new and desired to be secured by Letters Patent of the United States is:

1. A tracked support for movably supporting a cabinet on a supporting surface comprising:
   (a) a carrier;
   (b) means for mounting said carrier on the cabinet;
   (c) said carrier including a flat horizontal load-bearing portion having a substantial area; and
   (d) a continuous flexible track mounted on said carrier and adapted to engage the supporting surface;
   (e) said track extending across said load-bearing portion whereby the weight of the cabinet is distributed over a substantial area of the supporting surface corresponding to the area of said load-bearing portion of said carrier;
   (f) said track being movable relative to said carrier to facilitate movement of said cabinet.

2. The tracked support of claim 1, wherein said carrier also has arcuate ends which extend from and are in line with said flat horizontal load-bearing portion.

3. The tracked support of claim 1, wherein said carrier also includes at least one cylindrical roller in line with said flat horizontal load-bearing portion to facilitate relative movement with said track.

4. The tracked support of claim 3, wherein said carrier comprises:

(a) a frame which forms said flat horizontal load-bearing portion and also includes two pairs of elongated side arms, each pair of said side arms extending above and beyond a corresponding end of said load-bearing portion; and
(b) a cylindrical roller rotatably positioned between each pair of said side arms;
(c) said rollers being positioned in parallel and being of such diameter that their common tangential plane is in the same plane as said flat horizontal load-bearing portion.

5. The tracked support of claim 1, wherein said means for mounting said carrier on the cabinet includes a member attached to said carrier and extending upwardly from said load-bearing portion.

6. The tracked support of claim 5, wherein:
(a) said member comprises a generally C-shaped rod and a vertical portion extending therefrom;
(b) said C-shaped rod having a horizontal portion pivotally attached to said carrier; and
(c) said vertical portion being adapted to be received in a recess formed in the cabinet.

7. The tracked support of claim 5, further including means on said member for adjustably engaging the cabinet to compensate for sloping supporting surfaces.

8. The tracked support of claim 7, wherein said means for adjustably engaging the cabinet comprises:
(a) threads formed on said member; and
(b) a nut adjustably engaging said threads.

9. The tracked support of claim 5, wherein said member comprises:
(a) a yoke having side arms, said arms having aligned apertures therein;
(b) a transverse pin extending through said apertures and through a mating aperture in said carrier to pivotally attach said yoke to the carrier; and
(c) a rod attached to a central portion of said yoke and extending upwardly therefrom;
(d) said rod being adapted to be received in a recess formed in the cabinet.

* * * * *